(No Model.)

A. H. FETTY.
HORSE COLLAR PAD.

No. 266,255. Patented Oct. 17, 1882.

Witnesses:
F. M. Burnham.
W. R. Keyworth.

Inventor:
Arnold H. Fetty
per:
W. Alexander
Attorney.

UNITED STATES PATENT OFFICE.

ARNOLD H. FETTY, OF CHAMPAIGN, ILLINOIS, ASSIGNOR TO HIMSELF AND FRANK K. ROBESON AND JOHN ROBESON, BOTH OF SAME PLACE.

HORSE-COLLAR PAD.

SPECIFICATION forming part of Letters Patent No. 266,255, dated October 17, 1882.

Application filed August 10, 1882. (No model.)

*To all whom it may concern:*

Be it known that I, ARNOLD H. FETTY, of Champaign, in the county of Champaign and State of Illinois, have invented certain new and useful Improvements in Horse-Collar Pads; and I do hereby declare that the following is a full, clear, and exact description thereof, reference being had to the accompanying drawings, and to the letters of reference marked thereon, which form part of this specification, in which—

Figure 1:
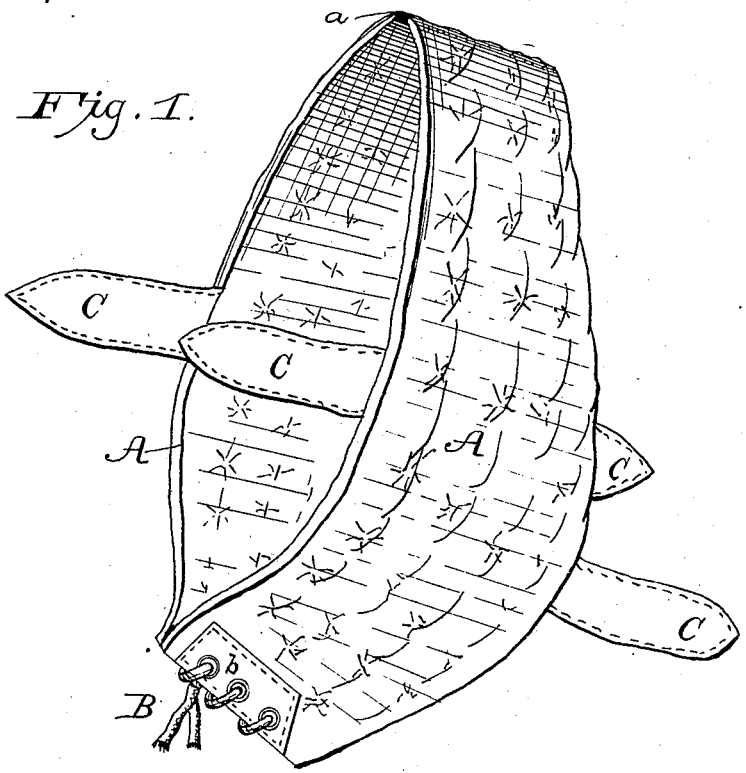
Figure 2:
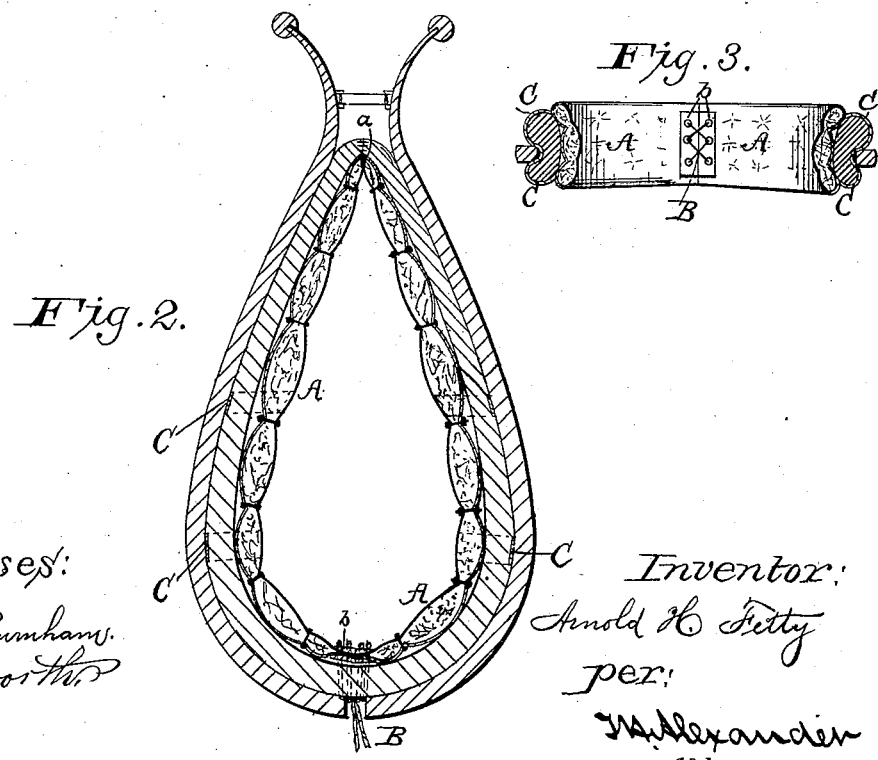
Figure 3:
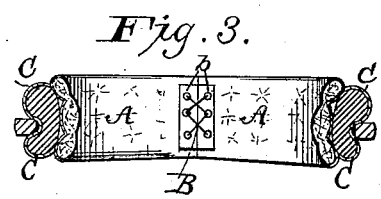

Figure 1 is a perspective view of my improved collar-pad provided with retaining-straps. Fig. 2 is a front sectional view, showing the pad applied to a collar, and confined in place by means of the retaining-straps. Fig. 3 is a horizontal section.

This invention relates to means for protecting the neck of a horse from chafing where it is found desirable to use collars; and the nature of my invention consists in the combination, with a collar-pad, of broad straps or tags which are so arranged that when applied to a collar, and the hames are confined in their places about a horse's neck, the pad will be positively held in its place between the collar and the neck of the horse, as will be fully understood from the annexed drawings and the following description.

My invention also consists in a horse-collar pad adjustably connected at its top or bottom and provided with retaining-straps interposed between the collar and hames, as will be hereinafter explained.

I have represented in Fig. 1 my improved collar-pad, which I construct of two quilted cheek-pieces or sides, which may be made of a woolen material on one side and a cotton or linen material on the opposite side, and which may be stuffed with hair or other suitable open material that will prevent undue heating of the neck of a horse. The cheeks or sides A A are connected at their upper or narrow ends by means of a flexible joint, *a*, and at their lower ends these side pieces of the pad are provided with re-enforcing pieces *b b*, formed of leather or other suitable strong material, securely stitched to the two thicknesses of material used in the construction of the outer layers of the pad. I make eyelets through the re-enforcing pieces *b b* and through the skins of the pad, and through the eyelets I insert a strong lacing-string, B, by means of which the pad is adjustably secured at its lower ends. These ends can, by the means described, be adjusted at different distances apart, and the collar-pad can be adapted for horses having large or small necks. The lacing-string is of such length that it can be passed around the throat of the collar, and thereby secure the pad positively or immovably to the collar at this point.

One of the essential features of my invention consists in the employment, in combination with the sides A A of the pad, of straps or tags C, arranged and suitably secured to the pad-sides, substantially as shown. These straps or tags C are made of a strong canvas or other suitable material, and they should be of suitable length to lap freely across the outer side of the collar, so that they will be drawn into the crease thereof and firmly bound down by the hames when the latter are secured in their places. The said straps or tags are stitched to the outer edges of the collar-pads, so that the pads are reversible—that is to say, the woolen sides or the opposite sides are interchangeable, as circumstances may require.

It will be seen from what I have above described that I have a reversible collar-pad which is entirely independent of the collar, which is adjustable for horses' necks of different sizes, which will protect a horse's neck from undue heating or chafing, which can be applied to or detached from a horse's neck without necessarily removing the collar, and which is positively held in its place by means of the straps, tags, or retaining-pieces C, that are so applied to the edges of the side pieces of the pads as will allow the same to be reversed when it is found necessary to do so.

Having described my invention, I claim—

1. A horse-collar pad constructed substantially as set forth, and provided with retaining-straps C C, adapted to lie between the collar and hames and hold the pad in place, substantially as and for the purpose described.

2. The combination, with a horse-collar and hames, of the pad A, adjustably connected at its top or bottom, and provided with retaining-straps interposed between the collar and hames, as and for the purposes set forth.

In testimony that I claim the foregoing as my own I affix my signature in presence of two witnesses.

ARNOLD H. FETTY.

Witnesses:
T. H. ALEXANDER,
F. O. McCLEARY.